United States Patent
Sun et al.

(10) Patent No.: US 8,611,915 B2
(45) Date of Patent: Dec. 17, 2013

(54) METHOD FOR PROVIDING CONTROL OF PUSH-TO-TALK COMMUNICATION

(75) Inventors: Shaobo Sun, Copenhagen (DK); Lennaart Hartwich Bjerring, Albertslund (DK)

(73) Assignee: Motorola Solutions, Inc., Schaumburg, IL (US)

( * ) Notice: Subject to any disclaimer, the term of this patent is extended or adjusted under 35 U.S.C. 154(b) by 670 days.

(21) Appl. No.: 12/649,591

(22) Filed: Dec. 30, 2009

(65) Prior Publication Data
US 2011/0159847 A1   Jun. 30, 2011

(51) Int. Cl.
*H04W 72/00* (2009.01)

(52) U.S. Cl.
USPC ........ 455/452.1; 455/453; 455/411; 455/519; 455/525; 455/445; 455/509; 455/513; 455/63.1; 455/67.11; 455/435.2; 455/26.1; 455/418; 455/528

(58) Field of Classification Search
None
See application file for complete search history.

(56) References Cited

U.S. PATENT DOCUMENTS

| | | | | |
|---|---|---|---|---|
| 5,850,611 | A * | 12/1998 | Krebs | 455/518 |
| 6,088,335 | A * | 7/2000 | I et al. | 370/252 |
| 6,208,872 | B1 * | 3/2001 | Schmidt | 455/518 |
| 6,671,512 | B2 * | 12/2003 | Laakso | 455/453 |
| 7,440,573 | B2 * | 10/2008 | Lor et al. | 380/270 |
| 7,529,203 | B2 * | 5/2009 | Bajic et al. | 370/328 |
| 2003/0210649 | A1 | 11/2003 | Bondi | |
| 2005/0101287 | A1 * | 5/2005 | Jin et al. | 455/404.1 |
| 2005/0282571 | A1 | 12/2005 | Oprescu-Surcobe et al. | |
| 2007/0110098 | A1 | 5/2007 | Hart et al. | |
| 2009/0109939 | A1 * | 4/2009 | Bhushan et al. | 370/337 |
| 2010/0246468 | A1 * | 9/2010 | Santhanam et al. | 370/312 |

FOREIGN PATENT DOCUMENTS

| | | |
|---|---|---|
| GB | 2443233 A | 4/2008 |
| WO | 9837668 A1 | 8/1998 |
| WO | 2006084952 A1 | 8/2006 |

OTHER PUBLICATIONS

ETSI EN 300 392-2 VS.4.2; Terrestrial Trunked Radio (TETRA); Voice Plus Data (V+D); Part 2: Air Interface (AI); Feb. 2004; Chapters 20 & 23; pp. 394-421 and 498-609.
PCT International Search Report Dated Mar. 28, 2011.

* cited by examiner

*Primary Examiner* — Willie J Daniel, Jr.
(74) *Attorney, Agent, or Firm* — Randi L. Karpinia; Daniel R. Bestor

(57) ABSTRACT

A method for providing control of push-to-talk communication of a plurality of wireless communication devices within a wireless communication system includes operating each of the plurality of wireless communication devices to: receive a load level indication broadcast from a base station, compare the received load level indication with an access privilege associated with each of one or more applications to determine whether initiation of each of the one or more applications is allowed, and disable at least one of the one or more applications when the compare step indicates initiation of the application is not allowed.

21 Claims, 3 Drawing Sheets

METHOD FOR PROVIDING CONTROL OF PUSH-TO-TALK COMMUNICATION

FIELD OF THE DISCLOSURE

The present disclosure relates generally to wireless communication and more particularly a method for providing control of push-to-talk communication to a group of wireless communication devices within a wireless communication system.

BACKGROUND

As communication network operators and user organizations evaluate their two-way radio needs for the future, many are reaching some similar conclusions: radio spectrum is becoming more congested and regulators are requiring the networks to do more with less, the demand for data transmission is more pronounced and often unachievable in narrowband systems, systems need increased functionality, secure communication is a growing necessity, and improved digital voice quality is essential over more of the coverage area.

It will be appreciated that upgrading a communications network is a major undertaking in terms of time, energy and expense. A number of possible solutions are available, including the digital technologies that are now available.

A radio frequency (RF) site becomes congested due to limited bandwidth and heavy load. Conventional mechanisms based on site load to prevent congestion can only delay the low privilege attempts by increasing access threshold and allowing the low privilege attempts to load the site as soon as the threshold is lowered again. These mechanisms fail to avoid congestion when the RF site is experiencing a sustained heavy load because the delayed attempts will make the site load even heavier when they are back to compete with the "normal" attempts for resources. In addition, existing mechanisms to indicate high load will cause a mobile communication device to leave the cell, which may not be desirable as it may thereafter cause congestion on a neighbor cell.

Accordingly, there is a need for a method for providing control of push-to-talk communication within a wireless communication system to prevent congestion of a radio frequency site.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
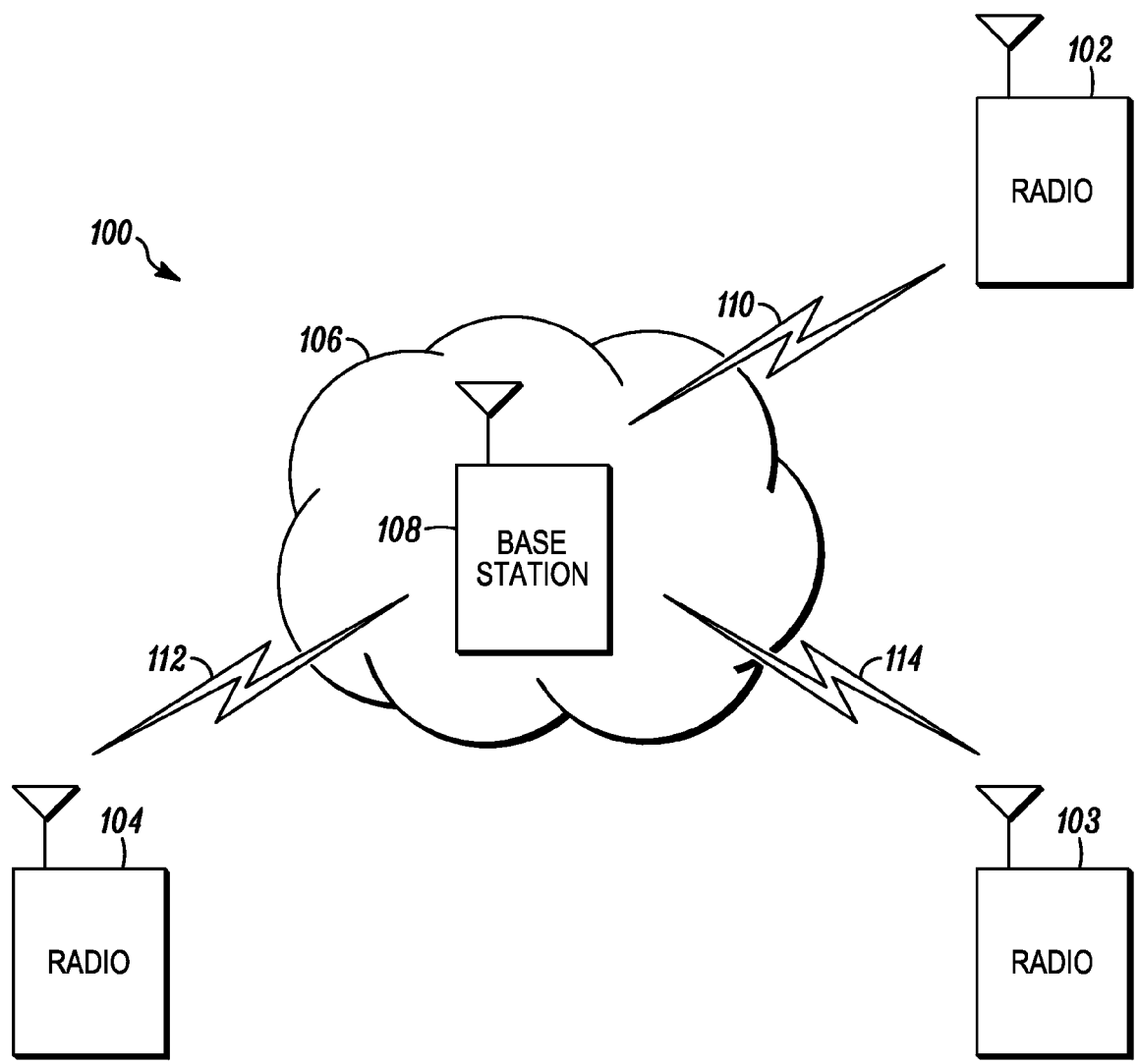
FIG. 1 illustrates a communication system in which various embodiments can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with some embodiments provided herein, a method to automatically disable a PTT functionality on a subscriber station whenever a "heavily loaded channel" indication (i.e. "access priority" indication) is perceived by the subscriber. The disabling of the PTT functionality only applies to the signaling channel that is indicated of being heavily loaded, (e.g. if a subscriber user is in a call on a voice traffic channel, the PTT functionality should be working as usual).

FIG. 1 illustrates a wireless communication system 100 in which various embodiments of the present invention can be implemented. For example, communication system 100 may be an Association of Public Safety Communications Officials International (APCO) 25 compliant system or a Terrestrial Trunked Radio (TETRA) compliant system.

The wireless communication system 100 comprises a plurality of communications devices such as the illustrated radios 102, 103, and 104, which may be, for example, a portable or mobile radio, a personal digital assistant, a cellular telephone, a video terminal, a portable computer with a wireless modem, or any other wireless communication device. For purposes of the following discussions, the radios will be interchangeably referred to herein as wireless communication devices, radios, mobile stations, mobile equipment, handsets, and/or mobile subscribers.

As illustrated, for example, the radios 102, 103, and 104 communicate over a radio access network 106. Those of ordinary skill in the art will realize that any type of network is within the scope of the teachings herein. Thus, the radio access network 106 may comprise infrastructure such as, but not limited to, base stations (BS) (with a single BS 108 shown for clarity), BS controllers (not shown), network elements (such as, a mobile switching center, home location register, visitor location register, a trunking resource controller, a console operator position, etc.), and the like, to facilitate the communications between radios having access to the radio access network 106. It will be appreciated by those of ordinary skill in the art that other radio access networks (not shown) can also be connected to radio access network 106 to enable communication over wider areas spanned by multiple radio access networks.

For example, radio 102, 103, and radio 104 can communicate with each other through BS 108. As is known by one of ordinary skill in the art, BS 108 generally comprises one or more repeater devices that can receive a signal from a transmitting radio over one wireless link and re-transmit to listening radios over different wireless links. For example, radio 102 can transmit over link 110 to BS 108 and BS 108 can re-transmit the signal to listening radios 103 and 104 over wireless links 114 and 112. BS 108 can also receive a signal from radio 103 over wireless link 114 and re-transmit the signal to radios 102 and 104 over wireless links 110 and 112. Alternately, BS 108 can receive a signal from radio 104 over wireless link 112 and re-transmit the signal to radios 102 and 103 over wireless links 110 and 114. For ease of illustration, only three radios and one BS are shown. However, those skilled in the art will realize that, in a typical system, a radio network can include any number of radios and any number of Base Stations. Moreover, although in this embodiment communication between radios 102, 103, and 104 are illustrated as being facilitated by BS 108, radios 102, 103, and 104 can communicate using a direct mode of operation without a BS. The teachings herein are equally applicable to direct mode operation between two radios.

Since network 106 is a wireless network, meaning that it supports a wireless or air interface protocol for signal transmission, the radios 102, 103, and 104, and BS 108, comprise transceivers that include a transmitter and a receiver for transmitting and receiving radio frequency (RF) signals, respectively. Radios 102, 103, and 104, and BS 108, further comprise one or more processing devices (such as microprocessors, digital signal processors, customized processors, field programmable gate arrays (FPGAs), unique stored program instructions (including both software and firmware), state machines, etc.) and typically some type of conventional memory element for performing (among other functionality) the air interface protocol and channel access scheme supported by network 106. Using these protocols, radios 102, 103, and 104 can each generate RF signals containing one or more data messages comprising a plurality of fields for organizing the continuous bits of information and/or signaling for transmission to another radio.

While one embodiment of a communication system 100 is described with regards to FIG. 1, those skilled in the art will recognize and appreciate that the specifics of this illustrative example are not specifics of the disclosure itself and that the teachings set forth herein are applicable in a variety of alternative settings. For example, since the teachings described do not depend on the type of air interface protocol or channel access scheme used (e.g., TDMA, Code Division Multiple Access (CDMA), Frequency Division Multiple Access (FDMA), and the like), the teachings can be applied to any type of air interface protocol and channel access scheme. The teachings herein can also be applied with any system and with any protocol utilizing wireline links. As such, other alternative implementations using different types of wireline or wireless protocols and channel access schemes are contemplated and are within the scope of the various teachings describe.

It will be appreciated by those of ordinary skill in the art that each radio 102, 103, and 104 is capable of Push-To-Talk (PTT) operation. As used herein, PTT refers to the generic functionality of initiating applications within a wireless communication system (as contrasted to just the physical PTT button). PTT operation, also known as Press-to-Transmit, is a method of conversing on half-duplex communication lines, including two-way radio, using a momentary button to switch from voice reception mode to a transmit mode. For example, the wireless communication network 100 can include a half-duplex channel (only one radio transmits at a time, though any number can listen) and a push-to-talk (PTT) switch that starts transmission.

Figure 2:
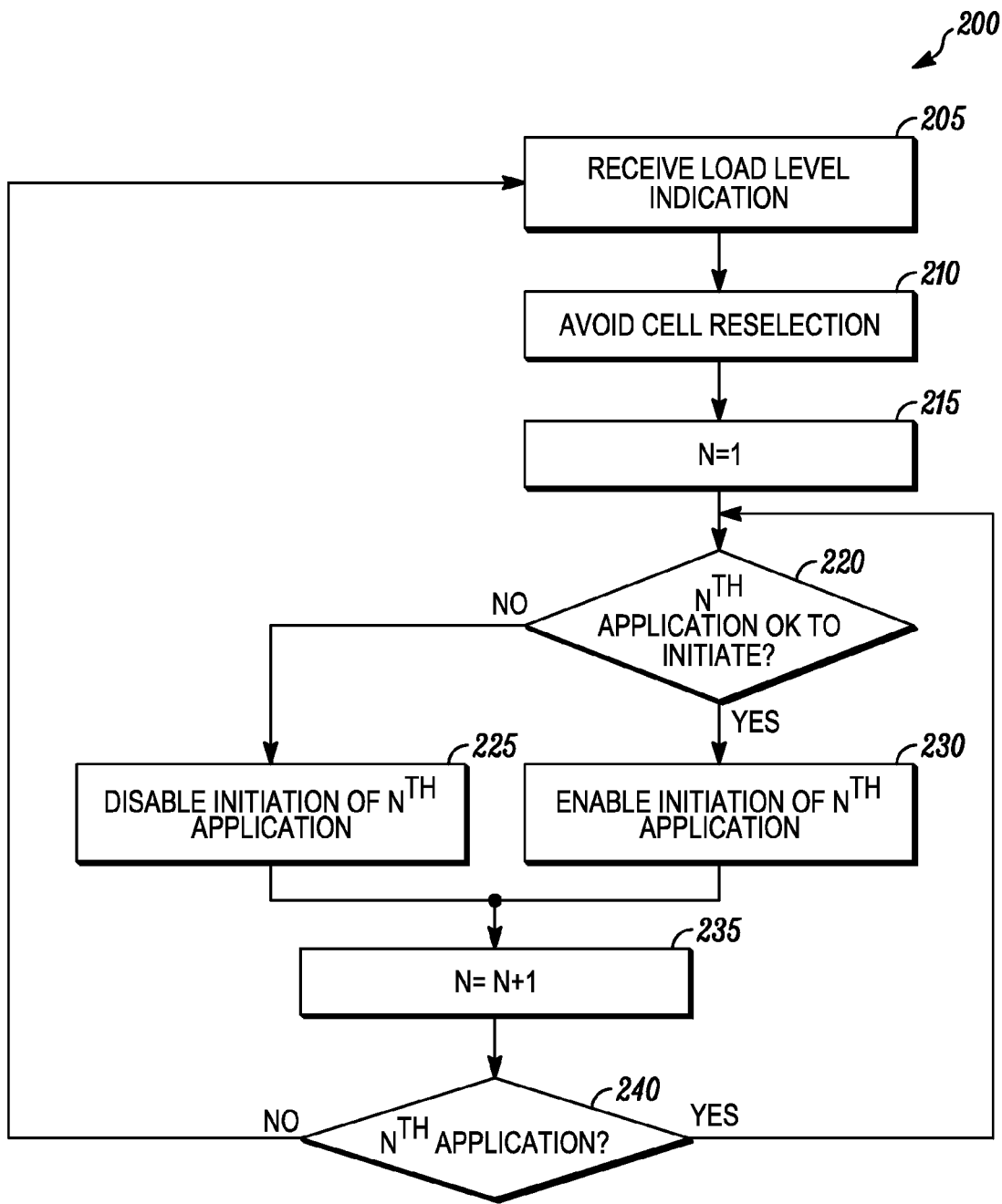
FIG. 2 is a flowchart of a method of controlling Push-To-Talk (PTT) operation of a plurality of wireless communication devices within a communication system in accordance with some embodiments.

FIG. 2 is a flowchart illustrating a method 200 for controlling PTT operation of a plurality of wireless communication devices within a wireless communication system in accordance with some embodiments. Specifically, method 200 is a method in a wireless network for a group of wireless communication devices to be disabled with initiating applications upon heavy load.

As illustrated, the method 200 begins with Step 205 in which a wireless communication device 102, 103, 104 receives a load level (access priority) indication broadcast from a base site 108. Next, in Step 210, the wireless communication device 102, 103, 104 avoids performing cell reselection in response to receiving a load level indication as appropriate. The wireless communication device (not shown) makes a roaming decision (whether or not to perform cell reselection) based on the broadcast site load level and on a privilege level for the particular communication device. In other words, the wireless communication device evaluates the received load level broadcast in combination with its pre-defined individual privileges and decide what action to take next (e.g. do business as usual, have PTT locked, or roam to neighbor cell if the individual device/application has the highest privilege and still evaluates the broadcast load level being high). It will be appreciated by those of ordinary skill in the art that avoidance of cell reselection only occurs where a load level indication is received and the device's privilege level indicates not to roam based on the received load level. In other situations (not shown), for example link failure and a subscriber physically migrating to another cell area, cell reselection may be performed by one or more of the communication devices. Next, in Step 215, an index N is set to N=1. Next, in Step 220, the wireless communication device 102, 103, 104 compares the received load level with an associated access privilege for an Nth application to determine whether or not initiation of the Nth application is allowed. It will be appreciated by those of ordinary skill in the art that in one embodiment the associated access privilege of each application is pre-configurable within the wireless communication device. When the Nth application is not privileged to be initiated with the received load level, the operation continues to Step 225 in which the Nth application is disabled from being initiated. When the Nth application is privileged to be initiated with the received load level, the operation continues to Step 230 in which the Nth application is enabled for initiation. After both Steps 225 and 230, the operation continues to Step 235 in which the index N is incremented to N=N+1. Next, in Step 240, the wireless communication device 102, 103, 104 determines whether it has an Nth application. When it has an Nth application, the operation cycles back to step 220 to determine whether to enable or disable the Nth application based on the received load level indication. When it does not have an Nth application, the operation cycles back to Step 205 to receive a new load level indication. In the manner described and illustrated in FIG. 2, applications can individually be enable or disabled based on current load level. As a site load is lowered, disabled low level functionalities can thereafter be re-established.

Figure 3:
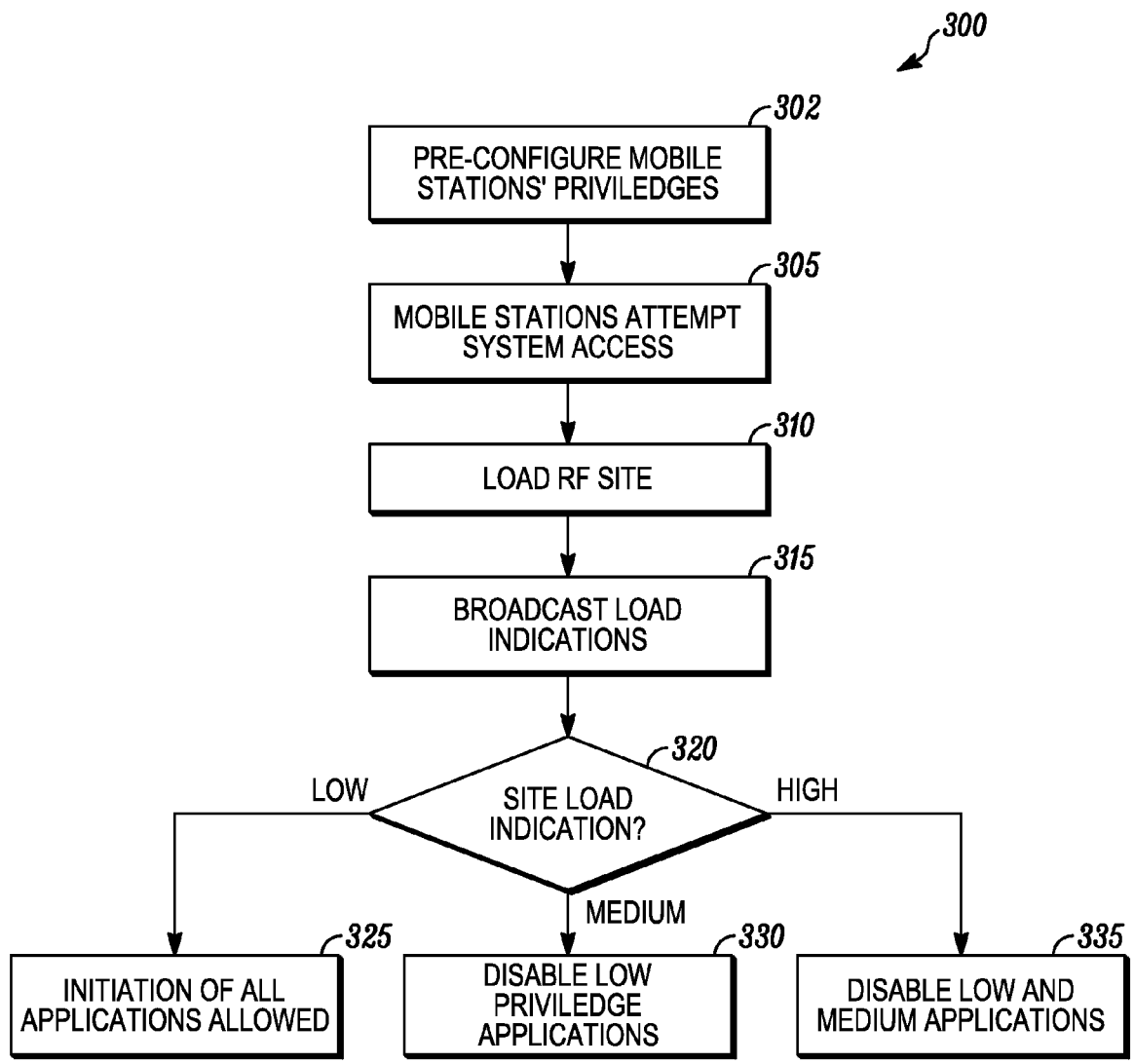
FIG. 3 is a flowchart illustrating further detail of a method for controlling PTT operation of a plurality of wireless communication devices within a communication system in accordance with some embodiments.

FIG. 3 is a flowchart illustrating further detail of a method 300 for controlling PTT operation of a plurality of wireless communication devices within a wireless communication system in accordance with some embodiments.

As illustrated in FIG. 3, the operation begins with Step 302 in which each mobile station (for example, radios 102, 103, 104) is pre-configured with various privileges, e.g. "low", "medium", and "high." Next, in Step 305, each of a plurality of mobile stations (subscribers) attempts to access the system via random access on an uplink of the signaling channel. Next, in Step 310, depending on number of mobile stations on a RF site and an average frequency that each mobile station initiates applications, the RF site is loaded accordingly. For example, a base station 108 may receive requests to access the system from each of radios 102, 103, 104 and load a RF site of which it services using historical data for each of the radios based on frequency of application initiation and the like.

Next, in Step 315, the load levels are broadcast. For example, in a TETRA system, a Switching and Management Infrastructure (SwMI) monitors site load and broadcasts the load indication in a plurality of levels via a base station to all mobile stations on the RF site. For example, the SwMI may broadcast the load indication in a low, a medium, and a high level. Alternatively, the SwMI may also broadcast the load indication in other forms, for example, minimum protocol data unit (PDU) priority, access code, subscriber class, and the like.

Next, in Step 320, operation continues dependent upon what the site load indication is at the moment. When site load indication is "low", the operation continues to Step 325 in which every mobile station may freely initiate any application on the uplink signaling channel. When site load indication is "medium", the operation continues to Step 330 in which applications with a "low" access privilege are disabled within each Mobile Station. For example, low privilege applications such as Automatic Vehicle Location (AVL) applications and data applications may be disabled. When site load indication is "high", the operation continues to Step 335 in which all mobile stations disable applications with "low" access privilege. For example, low privilege applications such as AVL applications and data applications may be disabled. Further, with a site load indication of "high", all mobile stations further disable applications with "medium" access privileges. For example, low level applications such as AVL and data applications and medium level applications such as non emergency calls may be disabled.

The embodiments described herein, therefore, will prevent the RF site from being congested not by delaying the attempts with low privileges but by preventing them from being initiated, (e.g. automatically locking the PTT button) upon heavy load, thereby silencing the mobile subscriber.

The embodiments described herein employ an "access priority" indication broadcast by the base site. By combining the "access priority" indication with subscriber privileges, the subscriber will be prevented from initiating applications (i.e. silenced), (e.g. in the order of (1) AVL and data application, (2) Private call & Telephone call, (3) Group call, etc.). Note that this only applies to the congested signaling channel on site and only applies to uplink initiations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing control of communications among a plurality of wireless communication devices within a wireless communication system employing separate signaling and traffic channels so as to conserve resources of an uplink portion of the signaling channel as a function of base station indicated loading, the method comprising:

operating each of the plurality of wireless communication devices to:

receive a load indication at the wireless communication device broadcast from a serving base station, wherein the load indication indicates a load level of an uplink portion of the signaling channel at the base station, compare, at the wireless communication device, the received load indication with an access privilege preconfigured at the wireless communication device, and respectively:

first, and as a function of the comparison, determining whether to initiate cell reselection and roam to a neighbor cell or continue to receive service from the serving base station; and second, if the result of the first determination is to continue to receive service from the serving base station and as a function of the comparison, identify one or more un-initiated uplink portion of the signaling channel consuming applications to at least temporarily bar from initiating at the wireless communication device, and if the result of the first determination is to initiate cell reselection, initiating cell reselection; and if the result of the first determination is to continue to receive service from the serving base station, temporarily barring from initiation at least one of the one or more un-initiated uplink portion of the signaling channel consuming applications as a function of the second identification.

2. The method as claimed in claim 1, further comprising operating each of the plurality of wireless communication devices to:

refrain from performing cell reselection in response to receiving the load indication and determining that, based on the access privilege preconfigured at the wireless communication device associated with performing cell reselection as a function of the received load indication, cell reselection should be disabled.

3. The method as claimed in claim 1, further comprising operating each of the plurality of wireless communication devices to:

enable for initiation the at least one of the one or more un-initiated uplink portion of the signaling channel consuming applications when a subsequently received load indication and subsequent compare step indicates that initiation of the at least one un-initiated uplink portion of the signaling channel consuming application should now allowed.

4. The method as claimed in claim 1, wherein the access privilege associated with each of the one or more un-initiated uplink portion of the signaling channel consuming applications comprises one of a plurality of access privilege levels.

5. The method as claimed in claim 4, wherein the plurality of access privilege levels comprises different access privileges based on whether the received load indication indicates the un-initiated uplink portion of the signaling channel load is at a first level, a second level greater than the first level, and a third level greater than the first and second levels.

6. The method as claimed in claim 5, further comprising:

when the load indication is at the first level, the plurality of access privilege levels allowing each of the wireless communication devices to freely initiate any un-initiated uplink portion of the signaling channel consuming application.

7. The method as claimed in claim 5, further comprising:

when the load indication is at the second level, the plurality of access privilege levels causing each of the wireless communication devices to prevent from initiation each un-initiated uplink portion of the signaling channel consuming application with an associated first level access privilege.

8. The method as claimed in claim 5, further comprising:

when the load indication is at the third level, the plurality of access privilege levels causing each of the wireless communication devices to prevent from initiation, each un-initiated uplink portion of the signaling channel consuming application with a first level access privilege and each un-initiated uplink portion of the signaling channel consuming application with a second level access privilege.

9. The method as claimed in claim 1, further comprising:

operating each of the plurality of wireless communication devices to attempt to access a radio frequency (RF) site, associated to the base station within the wireless communication system; and operating the base station to determine the load level based at least in part on determining a number of wireless communication devices attempting to access the RF site and an average frequency with which each wireless communication device has initiated the one or more un-initiated uplink portion of the signaling channel consuming applications in the past.

10. The method as claimed in claim 9, wherein each of the plurality of wireless communication devices attempts to access the wireless communication network via random access on the uplink portion of the signaling channel.

11. The method as claimed in claim 1, wherein the at least one application prevented from being initiated comprises one of an automatic vehicle location (AVL) application and a non-emergency call application.

12. The method as claimed in claim 11, wherein the at least one application prevented from being initiated is the non-emergency call application.

13. The method of claim 12, wherein the non-emergency call is prevented from being initiated by locking a push to talk (PTT) button at the wireless communication device.

14. The method as claimed in claim 1, wherein the at least one application prevented from being initiated is a private call, while group calls are not prevented from being initiated.

15. A method of operation of a wireless communication device within a wireless communication system employing separate signaling and traffic channels so as to conserve resources of an uplink portion of the signaling channel as a function of base station indicated loading, the method comprising:

receiving, at the wireless communication device, a load indication broadcast from a serving base station, wherein the load indication indicates a load level of an uplink portion of the signaling channel at the base station, and responsively:

comparing, at the wireless communication device, the received load indication with an access privilege preconfigured at the wireless communication device, and responsively:

first, and as a function of the comparison, determining whether to initiate cell reselection and roam to a neighbor cell or continue to receive service from the serving base station; and second, if the result of the first determination is to continue to receive service from the serving base station and as a function of the comparison, identify one or more un-initiated uplink portion of the signaling channel consuming applications to at least temporarily bar from initiating at the wireless communication device, and if the result of the first determination is to initiate cell reselection, initiating cell reselection; and if the result of the first determination is to continue to receive service from the serving base station, temporarily barring from initiation, at the wireless communication device, at least one of the one or more un-initiated uplink portion of the signaling channel consuming applications as a function of the second identification.

16. The method as claimed in claim 15, further comprising operating the wireless communication device to:

refrain from performing cell reselection in response to receiving the load indication and determining that, based on the access privilege preconfigured at the wireless communication device associated with performing cell reselection as a function of the received load indication, cell reselection should be disabled.

17. The method as claimed in claim 15, further comprising operating the wireless communication device to:

enable for initiation the at least one of the one or more un-initiated uplink portion of the signaling channel consuming applications when a subsequently received load indication and subsequent compare step indicates initiation of the at least one un-initiated uplink portion of the signaling channel consuming application should now allowed.

18. The method as claimed in claim 15, further comprising:

when the load indication is at the first level, operating the wireless communication device to freely initiate any un-initiated uplink portion of the signaling channel consuming application.

19. The method as claimed in claim 15, wherein the access privilege associated with each of the one or more un-initiated uplink portion of the signaling channel consuming applications comprises different access privileges based on whether the received load indication indicates the uplink portion of the signaling channel load is at one of a first level, a second level greater than the first level, and a third level greater than the first and second levels, the method further comprising:

when the load indication is at the second level, operating the wireless communication device to prevent from initiation, each un-initiated uplink portion of the signaling channel consuming application with an associated first level access privilege; and when the load indication is at the third level, operating the wireless communication device to prevent from initiation each un-initiated uplink portion of the signaling channel consuming application with a first level access privilege and each uplink signaling channel consuming application with a second level access privilege.

20. The method as claimed in claim 15, wherein the at least one application prevented from being initiated is a non-emergency call, and is prevented from being initiated by locking a push to talk (PTT) button at the wireless communication device.

21. The method as claimed in claim 15, wherein the at least one application prevented from being initiated is a private call, while group calls are not prevented from being initiated.

* * * * *